ELECTRONIC DEVICE FOR AUTOMATICALLY DISCRIMINATING BETWEEN SPEECH AND MUSIC FORMS

Filed Nov. 7, 1951

4 Sheets-Sheet 1

INVENTOR

Robert Clark Jones

BY Charles Mikulka

ATTORNEY

INVENTOR
Robert Clark Jones
BY Charles Mikulka
ATTORNEY

Sept. 4, 1956 R. C. JONES 2,761,897

ELECTRONIC DEVICE FOR AUTOMATICALLY DISCRIMINATING BETWEEN SPEECH AND MUSIC FORMS

Filed Nov. 7, 1951 4 Sheets-Sheet 3

INVENTOR
Robert Clark Jones

BY Charles Mikulka
ATTORNEY

INVENTOR
Robert Clark Jones
BY Charles Mikulka
ATTORNEY

United States Patent Office 2,761,897

Patented Sept. 4, 1956

2,761,897

ELECTRONIC DEVICE FOR AUTOMATICALLY DISCRIMINATING BETWEEN SPEECH AND MUSIC FORMS

Robert Clark Jones, Cambridge, Mass.

Application November 7, 1951, Serial No. 255,235

22 Claims. (Cl. 179—1)

This invention relates to electronic devices for automatically discriminating between speech and music.

It has heretofore been proposed to equip signal receiving devices, such as radio receivers whose program circuit sometimes carries speech and sometimes carries music, with automatic music-speech discriminating units which are capable, for example, of silencing the device whenever the received signal is predominantly speech. (Adair, Reissue Patent No. 21,151, issued July 18, 1939, for Radio Receiving System, and Radio News, March 1948, p. 60.) Other proposals have contemplated devices which serve to silence a radio for predetermined periods of time in response to some simple stimulus by a human observer, such as the clapping of hands. (Review of Scientific Instruments, February, 1950.) The latter type of device possesses a distinct disadvantage of requiring, for its operation, the presence and participation of a human observer, whereas the former proposals contemplated fully automatic systems. To date, however, the several proposals for fully automatic speech-music discriminators have embodied specific circuit arrangements which have proven entirely impractical for their intended purpose. Not only were certain of the proposed automatic circuits of questionable operativeness but in each case they depended for their operation upon properties of the received signals which constituted unreliable criteria for distinguishing speech from music in even their pure forms and were entirely unsuited for distinguishing between such mixed and modified speech and music forms as are normally encountered in radio programs.

One object of the present invention is to provide a novel electronic circuit which gives an extremely reliable, stable and fully automatic unit for discriminating between speech and music.

Another object is to provide a novel circuit of the above type which is especially reliable in its ability to distinguish between various stages of the speech and music forms, mixed and modified, which are encountered in actual practice.

Still further objects of the present invention are to provide in a radio-receiving circuit an electronic device for eliminating the music portion of a program, as for example in the monitoring of foreign broadcast stations; or for eliminating the speech portion; or for raising or lowering the level of the speech relative to the music, as in "storecasting" or "transitcasting."

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
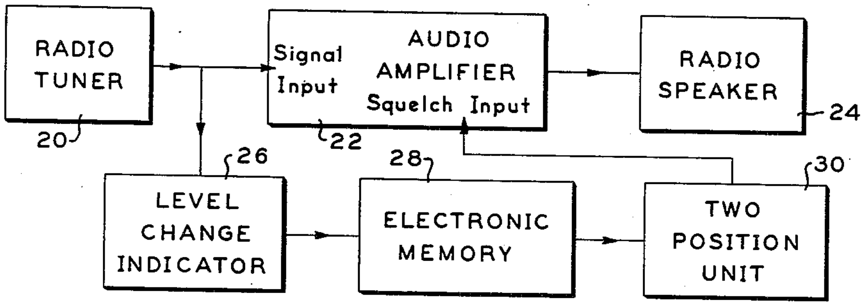
Figure 1 is a schematic representation, in block form, of an electronic unit for automatically discriminating between speech and music in accordance with the present invention, said device being shown as part of a radio-receiving circuit.

According to the present invention it has been determined that speech sounds possess certain distinguishing variations in level, decibel and/or voltage, which can serve as extremely reliable criteria upon which to predicate the operation of an automatic speech-music discriminator. These criteria are the rapid changes in level of speech as compared to music, and especially the rapid drops in level of speech. While there is some occurrence of rapid rises in level in music, they do not compare in frequency to the rapid rises in speech and there are essentially few rapid drops in music whereas they occur very frequently in speech. Accordingly, the present invention comprehends a circuit arrangement which includes detection means for responding to rapid changes in level, and especially rapid drops in level, of the input signal for actuating a suitable control device which may, if desired, operate in turn to shut off the radio receiver whenever the input signal is either speech or music.

The existence of the rapid drops in speech, as contrasted with their relative absence in music, is dependent upon three distinct factors:

1. The character of speech sounds themselves as distinct from the sounds of most musical instruments.

2. Speech is usually heard with substantially no reverberation, whereas music is usually heard under circumstances in which the reverberation is the main part of the sound heard. The reverberation causes all sounds to drop in level slowly.

3. Most music is orchestral music involving several instruments performing simultaneously. The result is that some musical instruments are performing all the time so that there is little opportunity for sudden drops in level, even if there were no reverberation.

Thus, discriminators based on measuring the number and amplitude of the fast drops in the level are based on the characteristics of the sounds themselves, on the reverberation conditions under which the sounds are usually heard, and upon the instrumentalities which normally produce the sounds.

To fully appreciate the reliability of the circuits comprehended by the present invention it must be realized that in practice there is no music-speech dichotomy. There is a continuous transition from speech to music and all of the stages of this transition occur in practice in radio programs. The following list suggests some of the stages of the transition with the most speechlike sounds at the top and the most musiclike sounds at the bottom:

Stentorian speech of the type used in commercial advertisements on local radio stations Conversational speech as ordinarily used in the description of music or in soap opera Chanting, as used in some religious ceremonies "Singing commercials"

Patter songs with faint orchestra
Patter songs with orchestra, as in Gilbert and Sullivan and in some popular songs
Simultaneous speech and music with the speech louder than the music
Singer with jazz orchestra
Concert singer with orchestra
Opera singer with orchestra
Solo instruments
Instrumental quartets
Instrumental chamber music
Symphony orchestra The devices constructed in accordance with the present invention can be adjusted to distinguish between the stages of the above scale with far greater reliability than has been previously achieved. They can be made to control the operation of a radio receiver so as to reject, reliably, stentorian or conversational speech and "singing commercials," and to pass, reliably, all instrumental music and concert and operatic singing.

One form of circuit comprehended by the present invention comprises as a first element a means for detecting rapid changes in the decibel and/or voltage level of an input signal, the output of said means providing an indication, such as, for example, a pulse, that may serve as a suitable measure of the amplitude and/or speed of these rapid changes in level. This information is then transmitted to an electronic memory whose output indication is a suitable measure of a finite portion of the immediately preceding history of the output of the detecting means. The output of the electronic memory actuates a multiposition element which preferably has only two positions or aspects, one aspect indicating that the audio signal is a sound above a certain stage in the scale of speech and musiclike sounds hereinabove noted, and the other aspect indicating that the audio signal is below this same stage. For example, one aspect may indicate when the signal received is chanting or a more speechlike sound and the other will then indicate when the signal represents a musiclike sound at a stage below chanting in the foregoing list of sounds. Of course, either of these aspects of the unit can be made to operate a suitable control for silencing the audio output of a receiver.

Referring now to Fig. 1 there is illustrated, by way of example, one combination of the above-described components as used for the specific purpose of silencing the speech portions of a radio program. As shown, the circuit comprises a radio tuner 20 of conventional construction whose output is delivered in the usual manner to an audio amplifier 22, which in turn actuates a radio speaker 24. The audio signal output of radio tuner 20 is also the input of a level change indicator 26 which serves, as hereinabove noted, to provide a measure of the amplitude and/or speed of the rapid changes in the level, voltage or decibel, of the said input. The output of level change indicator 26 is fed to an electronic memory 28 which provides a suitable measure of the immediate past history of the signals delivered by the level change indicator. The output of memory 28 is in turn fed into two-position unit 30 which includes an element capable of assuming at least two positions, depending upon the output of the memory. The two-position element of unit 30 is connected to the squelch input of the audio amplifier in such a way that the amplifier is squelched when the element is in one position and permitted to amplify normally when the element is in its other position. Since the operation of the memory is a measure of the rapid drops in level and since the latter are in turn a measure of the character of the sound represented by the signal output of the radio tuner, the two-position element in one position can be made to assume its squelching position when the audio signal is speech and to assume its other position when the audio signal is music. For the sake of simplicity, reference will hereinafter be made to speech and music as though they were two distinct sound forms, but it is to be expressly understood that such reference is intended to mean, on the one hand, sounds above a predetermined stage in the scale of sounds hereinabove identified, and, on the other hand, the sounds below this same stage.

It is to be observed that in the circuit of Fig. 1 the electronic memory 28 and the two-position unit 30 are connected in tandem but, as will appear hereinafter, the operative components of these two elements of the combination can be associated in some different manner to effect the same desirable objective.

Figure 2:
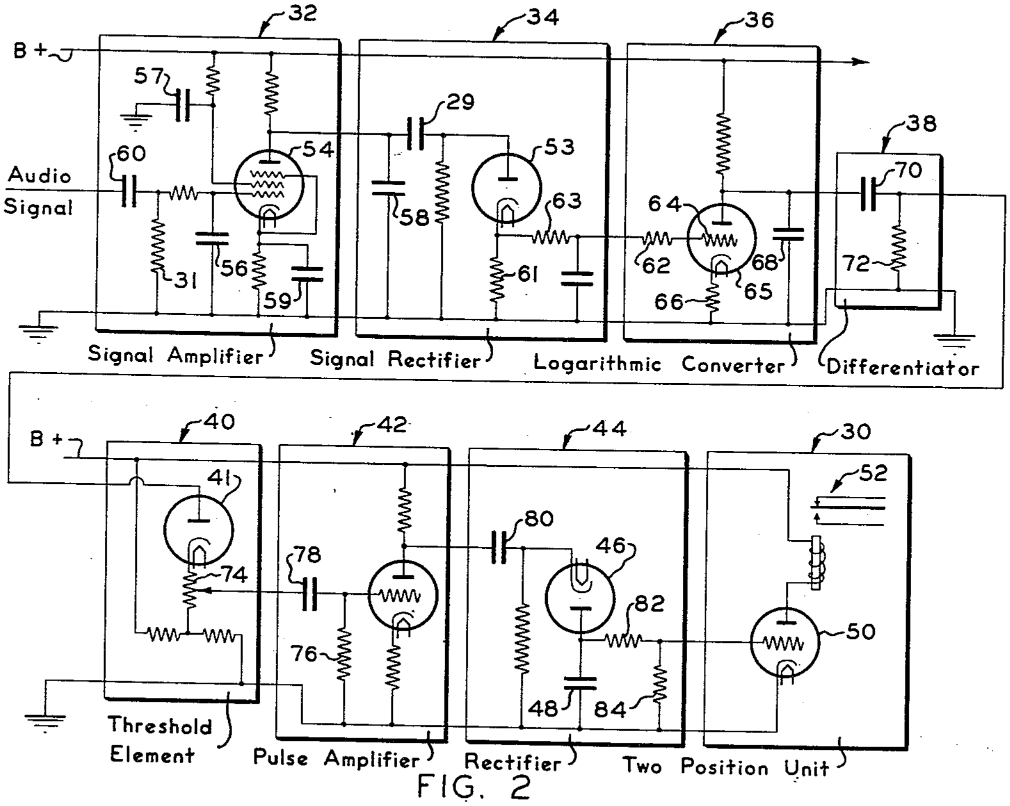
Fig. 2 is a schematic representation of one specific embodiment of the automatic speech-music discriminator of the present invention.

One preferred specific embodiment of the present invention is shown in Fig. 2 and in this form of the invention the circuit employs seven electronic elements and a relay. Preferably, six of the electronic elements are components of dual function vacuum tubes so that for the entire circuit only four separate vacuum tubes need be used. As shown, the input signal to which the speech-music discriminator is to respond is fed first to an amplifier 32 and from amplifier 32 is delivered to a signal rectifier 34. Its output is in turn fed to a logarithmic converter 36 which obtains the logarithm thereof so that the output of said converter becomes a measure of the decibel level of the original signal. To provide the time rate of change of the decibel level of the input signal by said converter there is connected to the latter a differentiator 38. The fifth element of this component of the combination is the threshold element 40 which converts the output of the differentiator 38 so that only pulses which correspond to the decreases of the decibel level of sufficient speed and amplitude emanate as the output of the said threshold element. These five components, namely, amplifier 32, rectifier 34, logarithmic converter 36, differentiator 38 and threshold element 40, provide the level change indicator component of the combination, i. e., the component corresponding to element 26 of Fig. 1.

The output of the level change indicator is then fed to the memory component of the combination which comprises, in the form shown, two elements, an amplifier 42 and a rectifier 44, the latter having a long discharge time constant provided by the condenser 48 and the resistors 82 and 84. A fraction of the output of condenser 48 is fed to the two-position unit 30, the latter comprising, as shown, a relay amplifier 50 which receives the modified output of condenser 48 and operates a relay 52. Relay 52 may be suitably connected to the audio amplifier of a radio receiving system, as shown in Fig. 1, to silence the latter when speechlike sounds are being received.

Before describing in detail the specific components of each of the above elements it will be helpful to consider the general function performed by these elements as represented graphically in Figs. 3 through 9.

Figures 3, 4, 5, 6, 7, 8, 9:
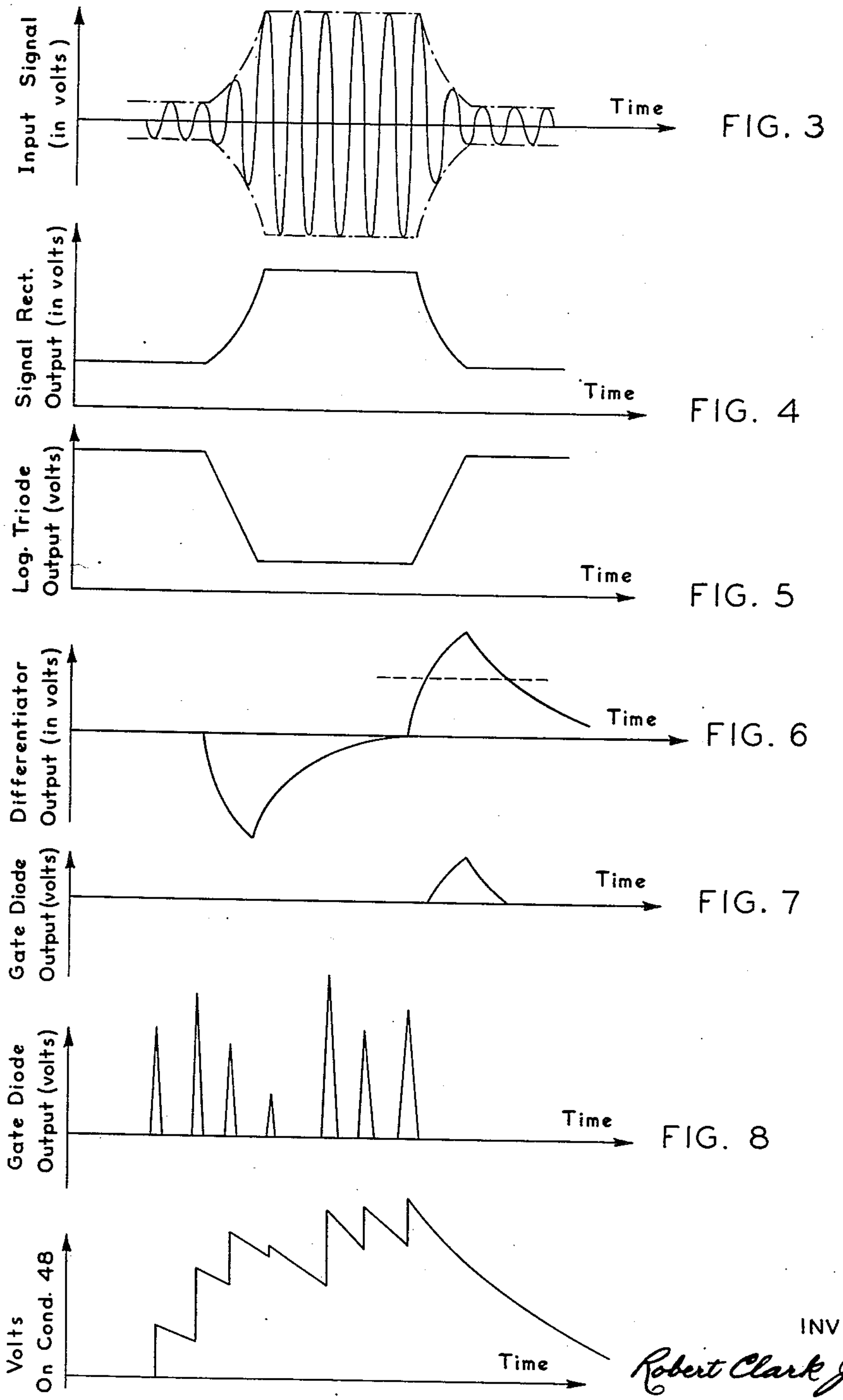
Figs. 3 through 9 are graphs which serve to illustrate the operation of components of the specific device illustrated in Fig. 2.

A typical segment of an audio signal input representing speech, as amplified by amplifier 32, is illustrated graphically in Fig. 3 and it is to be observed that the envelope of this signal shows a rapid rise and rapid drop. The drops in level occur on the average several times a second. The drops differ somewhat in character for different speakers and for different speech sounds. An average drop for a typical speaker occurs at a rate of about 400 decibels per second, has an amplitude of about 20 decibels and lasts about 50 milliseconds. A typical drop occurs on the word "stop" between the "sto" sound and the "p" sound; this drop occurs so rapidly that its presence is not usually noted. The amplitude of drops is usually greater for speakers with clear, crisp diction than it is for speakers with poor diction. For this reason the circuit of Fig. 2 can be satisfactorily employed as a simple and direct instrument for measuring the quality of the diction of a speaker.

The signal as rectified by element 34 is represented in Fig. 4 and is effectively confined to only the envelope of the original signal. The logarithmic converter 36 gives the logarithm of the signal, as shown in Fig. 5, and thus, by providing a measure of the decibel measure of the input signal accentuates the rapid drops in level of large decibel range. The logarithmic converter also inverts the signal. The signal conversion effected by the differentiator 38 provides a measure of the time rate of change of the decibel level of the input signal and this conversion is represented graphically in Fig. 6. The threshold element 40 then changes the output of differentiator 38 so that only pulses which correspond to rapid decreases of the decibel level are passed and, moreover, as shown in Fig. 7, only that part of such pulses is passed which corresponds to the part of the pulse which lies above the reference voltage set by the biasing voltage, which reference voltage is indicated by the dashed line in Fig. 6. The pulses passed by the threshold element 40 are amplified and a series of these amplified pulses, corresponding to a series of the signals represented by Fig. 3, is shown in Fig. 8 and for this series of pulses the voltage on the condenser 48 of element 44 is shown in Fig. 9. The ordinates of the graphic representation of Figs. 8 and 9 are, of course, plotted to a substantially different scale than are the ordinates of Figs. 3 through 7 covering a much longer time interval than the period covered by the prior representations. It is to be noted that the charge of condenser 48 decreases spontaneously and rather slowly so that the charge at any time on the condenser is an effective measure of the amplitude and frequency of the output pulses of the amplifier 42 during a predetermined short preceding interval of the order of several seconds. When the voltage charge on condenser 48 exceeds a predetermined charge it operates relay 52.

One specific operative embodiment of the circuit of Fig. 2 will now be described in detail, by way of illustration. With a 300 volts power supply, for example, the pentode 54 of amplifier 32 has a maximum output voltage of about 100 volts R. M. S. and the rectifying diode 53 is linear down to about 0.2 volt R. M. S. Amplifier 32 and rectifier 34 are thus linear for a 54 decibel range of input voltage. Since the gain available from ordinary pentodes is about 200, said amplifier and rectifier together will be linear for input signals in the range between .001 volt and 0.5 volt R. M. S. The maximum audio voltage available at the detector of nearly all radio receivers is at least 0.5 volt. Therefore, if the audio signal has a maximum voltage in excess of 0.5 volt suitable attenuation is preferably placed between the source of audio signal and the input of the signal amplifier.

Condensers 55 and 58, associated with elements 32 and 34, provide several R. C. high frequency cut-offs at 1500 cycles per second, and other condensers 60, 29, 57 and 59 several low frequency cut-offs at 400 cycles per second. Thus, the frequencies passed by the signal amplifier are primarily those involved in vowel sounds. The elimination of sibilants increases the frequency of the drops in level since otherwise some of the drops in the level of sound from the vocal cords would be covered up by sibilant sounds.

It may be noted that the simple type of rectifier employed as signal rectifier 34 has a charge time constant which is shorter than its discharge time constant. A large ratio of the long to the short time constant provides a large output voltage from a given input. However, care must be taken not to make the charge time too much shorter than the discharge time because then the rectifiers respond unduly to short pulses of high amplitude, such as those involved in impulse noise. A compromise is preferably achieved between these two opposing considerations by selecting a charge time constant which is approximately one-half of the discharge time constant, and this is done by making the resistors 61 and 63 approximately equal. For example, the charge time constant may be 4 milliseconds and the discharge time constant may be 8 milliseconds.

The logarithmic converter 36 employed in Fig. 2 is of the grid-current type. It operates on the basis of the fact that the grid voltage of ordinary triodes and pentodes (and also the plate voltage of diodes when the plate is negative with respect to the cathode) is a linear function of the logarithm of the grid current (plate current in case of diodes). For example, a typical relationship measured for a triode satisfactory for element 65 of this circuit is expressed by the following formula:

$$-e_g=0.17\ \log_{10} i_g+0.72$$

where $e_g$ is the grid voltage in volts and where $i_g$ is the grid current in microamperes. This relation was found to hold over at least 1000 to 1 range in the grid current, namely, for currents from 0.01 microampere to 10 microamperes, which range of current corresponded to the range of grid voltage from −1.05 to −0.55 volt.

In order that the grid current of the logarithmic triode 65 be proportional to the output voltage of the signal rectifier 34, a large resistance must be placed in series with the output of the signal rectifier. Accordingly, the output voltage of signal rectifier 34, which varies in the specific form illustrated from about 100 volts to 0.1 volt, is passed through a suitable resistor 62, for example a 10-megohm resistor, to the grid 64 of the log triode 65. The cathode resistor 66 is suitably selected so that the said output voltage from the signal rectifier produces a grid current in the said grid 64 which varies from 0.1 microampere to 10 microamperes. With such a cathode resistor the gain of the triode, which, in the preferred form, is a typical high-mu triode, is such that the 60 decibel range of signal voltage is converted to a change of plate voltage of the log triode on the basis of a 0.55 volt change per one decibel change in the signal level.

The actual plate voltage of a typical log triode satisfying the foregoing characteristics in one measured condition thereof varies from about 128 volts for a signal rectifier output of 0.1 volt to about 95 volts for a signal rectifier output of 100 volts. It is preferable to provide a condenser 68 which connects from the plate of the log triode 65 to ground and serves to remove the high frequency variations from the voltage.

The differentiator 38 comprises a series condenser 70 and a shunt resistor 72. The function accomplished by the differentiator 38 is not exactly equal to the mathematical operation known as differentiation, but is rather the operation known as "differentiation with a time constant." The network 38 does differentiate signal components of frequency less than $$\frac{1}{2\pi t}$$

(where $t$ is the time constant, $t=RC$) but does not differentiate signal components of frequency above $$\frac{1}{2\pi t}$$

The choice of the time constant of this differentiating resistor-condenser combination 70, 72 is based on several considerations. If the time constant is made longer than the duration of the drop in level, the voltage of the output pulse will be nearly as great for a drop of equal amplitude but with a slower rate. Since slow drops occur frequently in music, it is desirable to discriminate against such drops. If, on the other hand, the time constant of the differentiating circuit is made shorter than the duration of the drop then the amplitude of the pulse will be less and, furthermore, the higher frequency components in the voltage from the log triode will tend to obscure substantially the desired low frequency component. Accordingly, a time constant which is approximately equal to the duration of the average drop in level appears optimum. Nevertheless, substantial variations in this time constant value are possible without appreciably affecting the satisfactory operation of the circuit.

Threshold element 40 is preferably arranged to pass positive pulses whose amplitude is greater than a predetermined positive biasing voltage since a decrease in the level of the signal produces an increase in the plate voltage of log triode 65. This is accomplished in the circuit shown by biasing the cathode load resistor of the diode 41 with a positive voltage and by selecting the polarity of the diode so that it conducts for input voltages more positive than the biasing voltage. In one operative form of the invention this voltage is about 3 volts to 5 volts and is obtained by a divider from the plate supply voltage. A one megohm volume control 74 is inserted in the cathode of diode 41 in order to control the amplitude of the positive pulses which are transmitted to the memory 28.

The positive pulses from threshold element 40 are connected to the grid of the pulse amplifier 42 through a coupling network, comprising resistor 76 and condenser 78, with a low frequency cut-off chosen so that the pulses are not appreciably distorted. In this embodiment only a moderate gain is necessary and, accordingly, the cathode is left unbypassed. The amplified pulses at the plate of the pulse amplifier are negative pulses and are capacitatively coupled to the pulse rectifier tube element 46 through a condenser 80. Preferably the capacity of the storage condenser 48 is several times the capacity of coupling condenser 80, being in one preferred form four times the capacity of condenser 80. Thus, if the initial voltage across condenser 48 is zero, about one-fifth of the voltage of a given pulse at the plate of the pulse amplifier appears across the condenser 48 between ground and the plate of the pulse rectifier. The other four-fifths of the voltage appears across the coupling condenser 80. By selecting this four to one ratio for the condensers, the maximum storage voltage for repeated pulses of equal amplitude becomes five times the voltage produced by a single isolated pulse. A ratio substantially higher than four to one would produce a device that responds more slowly in operation because in such case the relay 52 would have to be set so as to require more pulses to cause it to release. The selection of a condenser ratio substantially lower than four to one will require a setting of the relay such that a single fast drop of large amplitude will cause the relay to release. Such isolated drops do occur, although very infrequently in music.

The voltage appearing across condenser 48 is then suitably reduced by the high impedance dividing network comprising resistors 82, 84, as shown, and the reduced voltage is fed to the two-position unit 30.

The two-position unit 30 comprises, as indicated hereinabove, a fairly sensitive nonpolar relay 52, the latter being placed in the plate circuit of the relay amplifier 50. If the signal at input to the speech-music discriminator circuit, i. e., the input to amplifier 32, is sufficiently continuous so that no pulses are delivered to the rectifier, the grid voltage of relay amplifier 50 will be approximately zero and the plate current will be sufficient to operate the relay. When, however, with a suitable setting of the pulse gain control 74, the frequency of the amplitude of pulses are sufficient to maintain, for example, several volts across condenser 48, then the grid voltage of said relay amplifier will be sufficient to reduce the plate current to a value such that the relay releases. In one preferred form of this circuit the relay is preferably adjusted so that it operates with a current of about 1.75 milliamperes and releases with a current of approximately 1.25 milliamperes.

The precise point on the above-described speech-music scale at which the relay operates or releases depends upon the setting of the volume control 74 in the cathode circuit of the threshold diode 41.

For several reasons it is desirable to employ a relay which may be adjusted so that the operate current of the relay is greater than the release current. The advantages of such an adjustment are:

1. Since the voltage on the condenser 48 increases suddenly but always decreases slowly, this adjustment makes it impossible for the relay to operate immediately once it has released. If the relay is used to reject speech, this means that once the relay releases and silences the speaker 24 the latter will stay silenced for at least one second, approximately. That is to say, the relay can not be made to jitter rapidly between the operate and release condition.

2. The indicated adjustment makes the device more reliable since, once the relay has released and is thus indicating that the input material is speech, the relay will not operate until the relay current increases above about 1.75 milliamperes.

Figure 10:
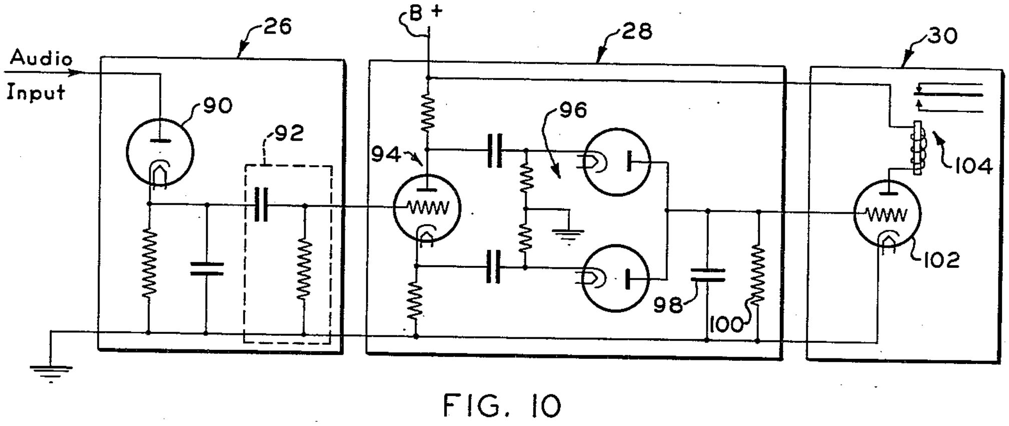
Fig. 10 is a schematic representation of an alternative specific embodiment of the speech-music discriminator.

A greatly simplified circuit comprehended by the invention is illustrated in Fig. 10 and, as shown, comprises, as components of its level change indicator 26, a signal rectifier 90 and a differentiator 92. The output of the differentiator 92 is fed directly to the electronic memory 28 which, in the form shown, comprises an inverter 94 which receives the output of differentiator 92 and in turn feeds its push-pull signal to full-wave rectifier 96, the output of the latter being directed to a storage condenser 98 shunted by a leakage resistor 100. The voltage from condenser 98 is delivered to the two-position unit 30 which comprises an amplifier 102 and relay 104 being, for example, connected to the amplifier of a radio receiver to squelch the output of the latter whenever the relay is in the released position.

It is to be observed that the above-described circuit is a substantially more simple circuit than the embodiment of Fig. 2. This increase in simplicity and attendant reduction in cost of the discriminator is achieved at the sacrifice of certain advantages which are inherent in the more complex arrangement of Fig. 2. For example, the use of the logarithmic converter 36 for obtaining the logarithm of the signal delivered by the signal rectifier 34 of the structure of Fig. 2 gives the important advantage of making the operation of the circuit completely independent of the average level of the input signal. The use of the drops in level only as a measure of the characteristic of the input signal improves the performance and the reliability of the circuit. Similarly, the provision of a threshold element 40 improves to a substantial extent the performance of the device since it permits the device to discriminate more effectively against slow drops and against drops of small amplitude.

Still another advantage possessed by the circuit of Fig. 2 resides in the controlled pass-band of said circuit. As noted hereinabove, said circuit is preferably so arranged as to have a frequency pass-band of approximately 400 to 1500 cycles per second. By providing a 1500 cycles per second cut-off the sibilants which would otherwise occasionally tend to cover up drops in the vowel sounds are eliminated. This 1500 cycles per second ceiling also reduces to a substantial extent the effect of noises such as static, interference and record scratch. The lower cut-off at 400 cycles per second in turn eliminates such undesirable interfering noises as hum, limiter thumps and turn-table rumble which might otherwise also cover up the drops in level. Moreover, the range of the pass-band is included within the band to which the ear is maximally sensitive. This provides the practical advantage that no sounds can be introduced in the transmitted program which would render the circuit inoperative without also reducing substantially the intelligibility of the speech.

Another advantage of the circuit of Fig. 2 is the provision therein of a series resistor in the signal rectifier; the shorting of this resistor tends to cause a very short signal pulse of the type present in impulse noise to be lengthened by the rectifier into a longer pulse having a drop on its trailing end. Impulse noise is perhaps the most common kind of man-made radio noise, ignition noise being a typical example.

Figure 11:
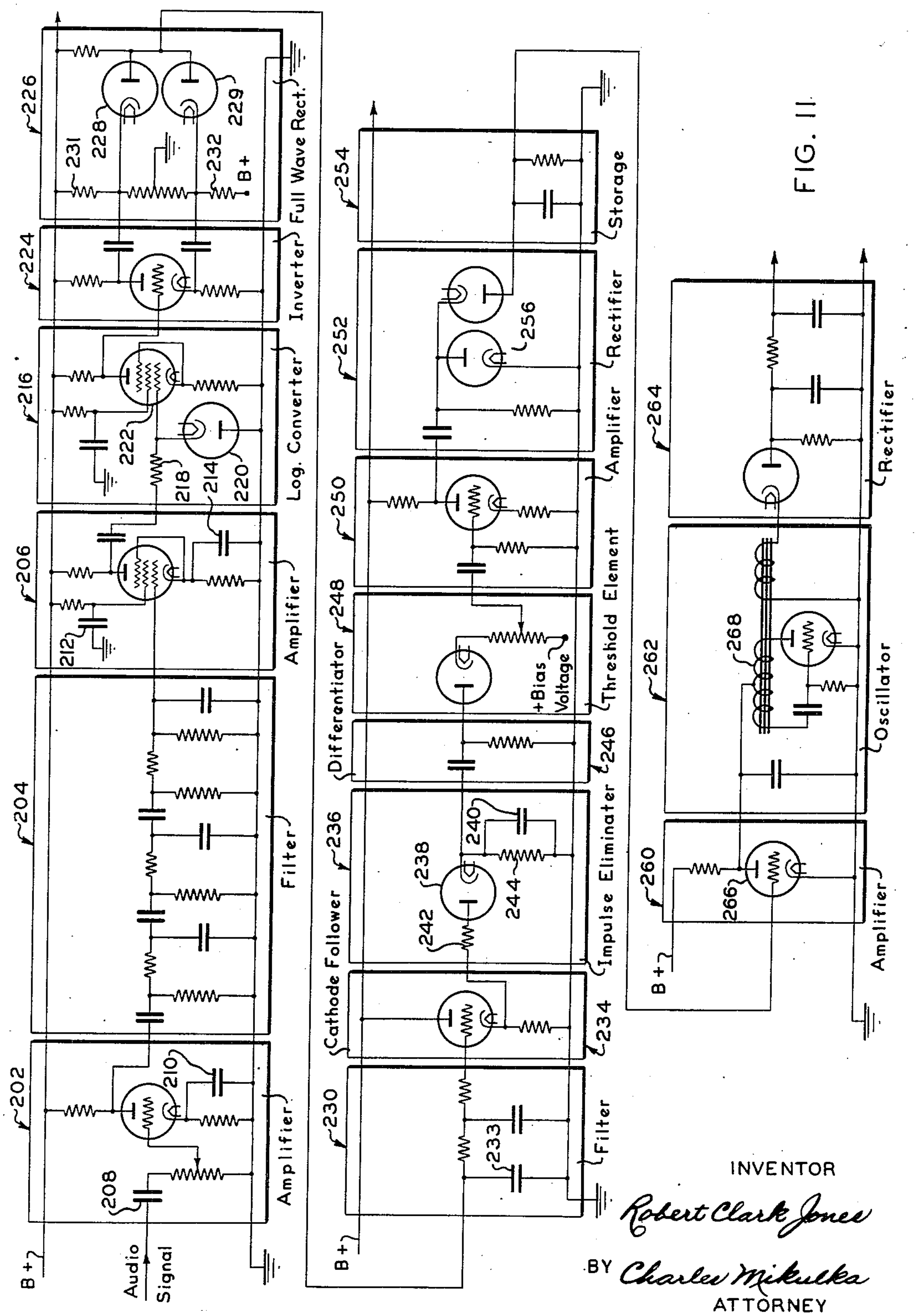
Fig. 11 is a schematic representation of still another embodiment of the speech music discriminator.

A somewhat more elaborate circuit for obtaining a more precise and reliable discrimination between speech and music forms is shown in Fig. 11 and, in the form illustrated, comprises a conventional triode amplifier stage 202 which receives the audio signal to which the discriminator responds.

The signal from amplifier 202 is then passed through a resistance condenser band-pass filter network 204 comprising a plurality of stages, three being shown in the illustrated embodiment. Because of the large number of resistances and condensers in this filter network there is obtained a very effective rejection of the audio components outside of the vowel region. The filtered signal is then further amplified by a conventional pentode amplifier stage 206. A pentode rather than a triode is used at this point in order to obtain a larger maximum output voltage.

A suitable choice of the condensers 208, 210, 212 and 214 provides additional attenuation of low-frequency signal components.

The audio-frequency signal at the output of the amplifier 206 is then passed through the logarithmic converter 216. The important components of said logarithmic converter are the large resistor 218, which causes the pentode to deliver through resistor 218 a current which is proportional to the instantaneous signal voltage from the amplifier 206, a diode 220 and a pentode 222.

In the logarithmic converter 216 the positive portions of the audio signal are converted to the logarithm thereof by the grid of pentode 222 whereas the negative portions of the audio signal are converted by the diode 220. It will be apparent that a triode could be substituted for the pentode to perform the same general function but the latter is preferred in order to reduce the input capacity of this component.

The signal output of the logarithmic converter 216 is then made push-pull by the inverter 224 of conventional design, and the push-pull signal is then rectified by full-wave rectifier 226 comprising diodes 228 and 229. The resistors 231 and 232 of this component serve to raise above ground the D. C. level of the voltages in the succeeding components by an amount equal to roughly one-third of the plate supply voltage. The output of the full-wave rectifier 226 is a linear function of the decibel level of the filtered audio signal.

It is to be noted that the signal rectification is accomplished in this embodiment after the logarithmic conversion whereas in the embodiment of Fig. 2 the signal rectifier is before the logarithmic converter.

The output of the rectifier is then preferably smoothed by a filter 230 whose purpose is to remove the signal components of audio frequency from the output of rectifier 226. The charge and discharge time constants of the rectifier 226, which feeds into said filter, are determined largely by the first condenser 233 of said filter 230. Both time constants are proportional to the capacity of this condenser. The smoothed signal is next preferably passed through a conventional cathode follower 234 to reduce the effective impedance of the voltage from the filter 230 and the signal from cathode follower 234 in turn passes through an impulse eliminator 236 which is a conventional diode rectifier with a discharge time constant long compared with the charge time constant.

It is of interest to note that the impulse noise present in the original audio signal is still present to some extent in the output of the cathode follower 234 and that the impulse eliminator 236 removes the effect of this impulse noise.

More specifically, impulse noise in the audio signal corresponds to a sudden rise in the level of the signal followed at once by a suddent drop. Thus, a single impulse of impulse noise causes a negative pulse at the output of the cathode follower 234, whereas a brief drop in level corresponds to a positive pulse. The polarity of the diode 238 in said impulse eliminator is such that positive pulses cause a sudden increase in the voltage across the condenser 240 whereas negative pulses produce only a slight drop. For example, the resistances 242 and 244 may be adjusted so that the impulse eliminator will not pass a rate of rise of voltage corresponding to a rate of rise of the original signal greater than 100 decibels per second, whereas it will pass a voltage corresponding to a rate of decrease in the original signal approximately equal to 1000 decibels per second. Thus, a 20 decibel drop in the audio signal lasting 0.02 second will be passed with full amplitude whereas a 20 decibel rise in the audio signal, also lasting 0.02 second, would be reduced to the effect a 2 decibel rise would have in the absence of the impulse eliminator.

The voltage output of the impulse eliminator is then differentiated by the differentiator 246 and passed through the threshold element 248 which is similar in structure and performs the same function as the threshold element of Fig. 2.

These aforementioned components of the structure of Fig. 11, in combination, constitute the level change indicator of the circuit.

The output of the level change indicator is then fed to an electronic memory comprising an amplifier 250, a rectifier 252 and a storage element 254 which are similar in structure and function to the components of the memory of the circuit of Fig. 2. The diode 256 which is absent in the corresponding element of Fig. 2 serves as a D. C. restorer which removes the overshoot of the pulses, which overshoot is due to the absence of D. C. continuity in the coupling networks at the inputs of amplifier 250 and rectifier 252. The voltage across the storage element 254 is the output of the memory and is the input to the two-position element comprising an amplifier 260, an oscillator 262, and a rectifier 264.

One simple method of squelching the audio amplifier of the radio receiver to which the discriminator may be connected, as shown in Fig. 1, is to supply from the two-position element a voltage which is substantially zero when the said element indicates "music" and which is highly negative when the said element indicates "speech." This voltage, if connected through a several megohm resistor to the grid of one of the amplifier tubes in the audio amplifier, will bias the grid beyond cut-off when the element indicates "speech." One difficulty of this simple method is that it requires a source of negative voltage and most electronic plate power supplies do not provide negative voltages. This difficulty is met in the design of Fig. 11 by employing an oscillator 262 and a rectifier 264 to supply the negative voltage. When the output voltage of the memory is low, the amplifier tube 266 draws a large current and thus has a low plate voltage. The perameters of the oscillator 262, and in particular the turn ratio of the coil 268, are such that oscillator 262 will not oscillate at a low plate voltage. As the negative voltage from the memory increases, the plate voltage of amplifier tube 266 increases and at a certain critical value causes the oscillator 262 to commence oscillation. The output voltage of the rectifier then rises abruptly from zero to a negative value of approximately 50 volts.

The output of the rectifier is suitable for connection to the grid or grid return of one of the amplifier tubes in the amplifier 22 of Fig. 1. When the oscillator 262 is not oscillating, the indication is "music" and the audio amplifier 22 amplifies normally. When, however, the oscillator is oscillating, the indication is "speech" and the output voltage of the rectifier 264 is sufficient to bias beyond cut-off the vaccum tube in the audio amplifier 22 with the result that the speaker 24 is silent.

The two-position element shown in Fig. 11 is thus particularly appropriate for use in connection with a power supply which does not supply voltages negative with respect to ground.

Just as with the relay in Fig. 2, it is desirable that the oscillator cease oscillation at a lower rate voltage than is required for initiating the oscillation. This condition is easily achieved and, in fact, is difficult to avoid with the simple circuit employed in Fig. 11.

The detailed considerations with respect to Fig. 11 which are similar to those of Fig. 2 have been omitted in the above discussion of Fig. 11.

Many modifications of the basic components of the above-described combinations are possible within the scope of the invention. For example, the range of signal levels over which the devices are operative may be effectively increased by introducing into the circuits an ordinary automatic gain-control amplifier of the negative-grid-bias feedback type. This can be accomplished, for example, in the circuit of Fig. 2 by a simple conversion of the rectifier element of said circuit, as by connecting another similar signal rectifier so that the latter also receives the output of the amplifier 32. The diode of this second rectifier is reversed and resistor 31 is disconnected from ground and connected to the output of said second rectifier. The discharge constant of the second rectifier is such that the rate of gain recovery is small compared with the 400 decibel per second typical drop in speech sounds, for example 10 to 100 decibels per second. This automatic gain control rectifier is biased positively so that a "delay" is obtained. Alternatively, a separate amplifier with an automatic gain control connected between the signal source and the circuit of Fig. 2 could effectively increase the range of signal levels over which the said circuit is operative.

Figure 12:
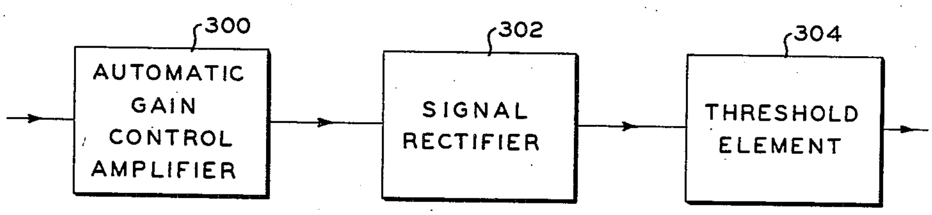
Figs. 12 and 13 are schematic representations in block form of modifications of level change indicators.

As noted hereinabove, one important desideratum in the circuits of the present invention is that they operate independently of the average level of the input signal and this is a principal advantage of employing logarithmic conversion. However, this same result may be achieved without logarithmic conversion by suitable use of an automatic gain control amplifier. A level change indicator embodying the above feature and suitable for use in the foregoing circuits in lieu of their level change indicators is illustrated in Fig. 12.

As shown, an ordinary automatic gain control amplifier 300 is connected in tandem with a signal rectifier 302, which may be like signal rectifier 34 of the circuit of Fig. 2, and the latter in turn feeds its output to a threshold element 304 which is similar to the threshold element 40 of the circuit of Fig. 2. The automatic gain control amplifier 300 preferably has a rate of gain recovery of one-half or one-third of the rate of decrease of typical drops in speech sounds. The latter, as noted hereinabove, is about 400 decibels per second so that a suitable value for the automatic gain control amplifier 300 is about 150 to 200 decibels per second. The threshold element in this circuit is so constituted as to pass only that part of the rectified output voltage which is less than a certain fraction, for example one-half to one-third of the normal steady output voltage of said amplifier 300.

The circuit of Fig. 10 can also be made to operate essentially independently of the average level of the input signal by means of an automatic gain control amplifier introduced into its circuit between signal rectifier 90 and the input source.

In connection with the various uses of automatic gain control amplifiers described above, it is perhaps useful to point out that nonlinear distortion is of no concern provided the level of the signal is not appreciably affected. This means that not only ordinary grid bias control or screen bias control may be employed, but also a less well-known type in which the automatic gain control bias drives the control grids positively. This type of automatic gain control is preferably employed with pentode vacuum tubes. The automatic gain control action is obtained through the fact that the positive control grid bias reduces the screen potential and thus reduces the gain of the amplified stage. Except here, all automatic gain controls are understood to be negative grid bias feedback type.

In the embodiment of Figs. 2 and 11 the logarithmic conversion is accomplished by a logarithmic converter of the grid current type but it will now be apparent that other arrangements may be effectively used for this purpose. For example, varistor networks are available commercially which operate over a 60 decibel range and even greater ranges can be obtained by using D. C. bias on such networks. (Journal of the Acoustical Society of America, page 559, 1951.)

Another arrangement for obtaining the logarithmic conversion is to use the automatic gain control bias of an automatic gain control amplifier. One such arrangement is shown, by way of example in Fig. 13, embodied in a level change indicator which could be substituted for the level change indicators of the foregoing circuits. This level change indicator, as shown, comprises the automatic gain control amplifier 400 whose automatic gain control bias is directly fed to a differentiator 402 and then to threshold element 404, the latter two elements being similar in structure to the differentiator 38 and the threshold element 40, respectively, of the circuit of Fig. 2. The automatic gain control amplifier 400 comprises variable gain amplifier 406 and rectifier 408, said variable gain amplifier having remote cut-off tubes whose gain can be controlled by varying the grid bias. It is well known that in the ordinary automatic gain control amplifier of this type the steady-state automatic gain control bias is a linear function of the logarithm of the envelope voltage of the input audio signal. Thus, the automatic gain control amplifier comprising elements 406 and 408 may be used in the circuit of Fig. 2 to replace the amplifier 32, the rectifier 34 and the log converter 36. It may be similarly employed in the circuit of Fig. 11 to replace amplifier 202, filter 204, amplifier 206, logarithmic converter 216, inverter 224 and full-wave rectifier 226.

In the various specific embodiments of the invention described above, the pulses at the output of the threshold element may be transmitted directly to the memory circuit, or they may be modified before being so transmitted. One modification which may be desirable is to convert the pulses so that they all have the same duration and/or amplitude. The amplitudes can be made equal by a limitor or by use of a Schmidt type flip-flop, and the equalization of both duration and amplitude can be obtained by using the pulses to trigger a nonrepetitive multivibrator.

In each of the circuits of Figs. 2, 10 and 11, the electronic memory is such that its memory of a given pulse decreases steadily as time goes on, i. e., the forgetting is continuous. It may be desirable, under some conditions, to employ a memory of different character. For example, it may be desirable that a given pulse have full effect on the output of the memory for a given time T, and then be forgotten completely. One means of obtaining a memory of this type is to employ a plurality of nonrepetitive multivibrators, each with an output pulse of duration T, combined with a distribution circuit which provides that an input pulse is connected to one and only one multivibrator and which provides that the input pulse is delivered to a multivibrator which is not delivering an output pulse. The summed output of all of the multivibrators is the memory output.

Another type of quantized memory consists of a hierarchy of flip-flop elements numbered from 1 to N connected so that 1. The *n*th flip-flop element flops back spontaneously at a time D after it receives a pulse, or at a time D after the $(n+1)$th flip-flop flops back, whichever is later.
2. The *n*th flip-flop flops back spontaneously at a time D after the last pulse which it receives.
3. Each input pulse is connected to the lowest flip-flop which is in the rest position.

Let M be the number of highest flip-flop which is not in the rest position. Then each input pulse increases the number M by one and, in the absence of input pulses, M decreases by one after each time interval of duration D.

A useful property of this type of memory is that it contains within it the two-position element 30 of Fig.

1. As a specific illustration, suppose that a hierarchy of four flip-flops is employed and that the third flip-flop is selected to serve as the two-position element. Then the two-position element will flip to the "speech" position after three pulses separated by intervals less than D or by four pulses such that two of the intervals are less than D and one of them is greater than D and less than 2D, and so on. Thus, after a series of pulses the interval between the last pulse and the return of the two-position element to the "music" position cannot be greater than 2D.

It may be desirable to have different values of D for the various flip-flops. For example, in the illustration just given, the duration D of the third and fourth flip-flops might advantageously be made greater than the D of the first and second flip-flops.

Substantial advantages accrue from incorporating a time delay in the audio amplifier 22 of Fig. 1, in such a way that the undelayed signal is presented to the automatic speech-music discriminator and that the output of the automatic-speech music discriminator operates on the delayed signal. One advantage is the elimination of the few syllables of speech that are heard before the speech is silenced. In the specific working embodiment of Fig. 2, for example, from two to four syllables are required at the beginning of a portion of speech to move the relay to the speech position. If, however, the audio signal is delayed a second or two by the audio amplifier, preferably by incorporating a magnetic tape delay element, the automatic music-speech discriminator will silence the audio amplifier just at the beginning of the delayed speech signal. Another advantage is that the first few notes of music after a portion of speech will always be heard, whereas if no time delay is employed they are sometimes missed. In the specific working embodiment of Fig. 2, for example, the relay returns to the "music" position approximately a second after the end of the speech. If, therefore, the music begins immediately after the speech, as much as one second of the music may be silenced, whereas this will not occur if the audio signal is delayed by one second in the audio amplifier.

Still another advantage, of a less direct type, is that the use of a time delay makes rapid action of the device less necessary and desirable. Accordingly, the various time constants of the memory may be lengthened, with a resultant increase in the reliability of the discrimination of the device.

Although the operation of the specific circuits of the present invention is predicated upon the rapid changes in level which characterize speech as compared to music, there exist other criteria for distinguishing speech sounds from music sounds. One of these is that speech is an alternation between sibilant sounds whose primary energy lies above 3000 cycles per second and vowels whose primary energy lies below 3000 cycles per second, whereas the frequency content of music does not fluctuate so markedly. Another is that the fundamental frequency of vowel sounds varies continuously and smoothly with time, whereas the dominant frequency in music varies discontinuously from one musical note to another.

Circuits based on these other criteria do not give a high degree of reliability unless excessively complex. However, simple circuits based on these alternative criteria, while less reliable than those described above, may, nevertheless, have distinct value if used as an auxiliary to the above-described circuits. A relatively simple discriminator based on these other criteria can be adjusted to have a high degree of one-sided reliability. That is to say, if the device indicates "speech" one may feel sure that the input is speech; if, however, the device indicates "music" the input may be either speech or music. Furthermore, because the criterion of operation is independent of that employed in the circuits described above, an indication of speech will have full reliability even in those rare instances where the circuits constructed in accordance with the present invention fail to indicate "speech" when the input is clear speech. A rare error of this type will usually be prevented if a device of one-sided reliability, based on one said other criteria, is connected as an auxiliary in such a way that the combined indication is "music" only when the two devices indicate "music" and is "speech" when either device indicates "speech." By this procedure relatively simple devices based on criteria less reliable but independent of rapid change in level may be used to increase the already high reliability of discriminators based on rapid level changes even through said devices do not have reliability adequate for independent operation.

Figure 13:
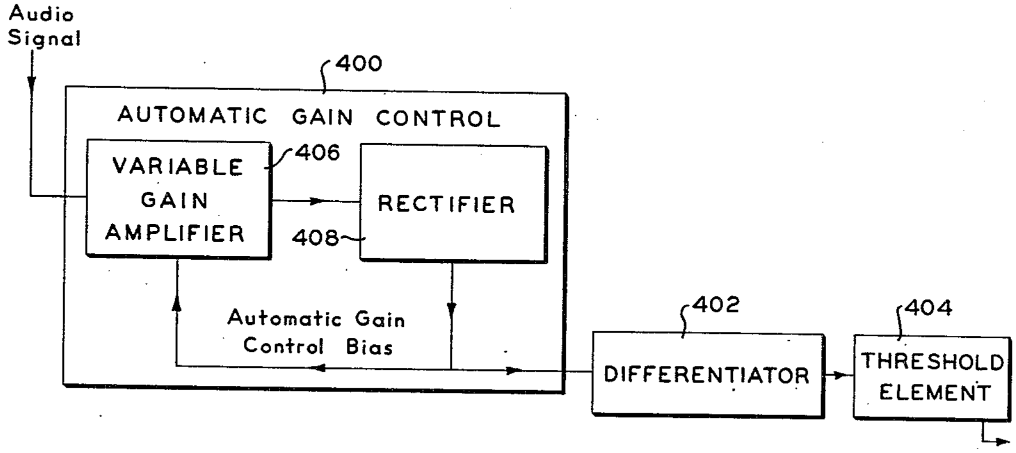

In the application of the automatic gain control amplifier as illustrated in Fig. 13, the rate of gain recovery of said amplifier is preferably substantially in excess of the rate of level decrease in the level drops in typical speech. For example, the rate of gain recovery of the amplifier may be of the order of 800 to 1000 decibels per second. On the other hand, where the automatic gain control amplifier is to be employed at the input of the circuits of Figs. 2 or 10 or 11, the rate of gain recovery of the amplifier is a small fraction of the average rate of level decrease of the level drops in typical speech, e. g., of the order of 10 to 100 decibels per second.

There is provided, in accordance with the invention, an extremely reliable and stable unit for discriminating between the various stages of speech and musiclike sounds encountered, for example, in radio broadcasting. There has been illustrated, by way of example, one application of such a device as a component of a radio or other input receiving circuit for controlling the audio output of the latter in accordance with the character of the input signal. It is, of course, understood that such electronic units could be either separate attachements or integral parts of complete radios.

Still another application in the radio field involves a plurality of the devices of the present invention, each being used in connection with several independent receivers tuned to different stations and with a relay system arranged to pass to the speaker the station of highest priority whose signal is either music or speech.

A further possibility for the electronic arrangement of the invention is in devices for use in public buildings, such as restaurants and hotels or in industry as a substitute for the musical programs which are now made available by means of telephonic installations. In connection with this use, an audio-automatic gain control circuit could be included in the system so as to produce a fairly even level of the music output.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An electronic device capable of automatically discriminating between speech and music, comprising, in combination, a level change indicator, means for connecting said level change indicator to an audio signal source so that the audio signal is the input of said indicator, said level change indicator responding to predetermined rapid changes in the level of said audio signal and producing an output signal which is a measure of the amplitude and speed of said changes, an electronic memory connected to said level change indicator to receive the output thereof and to provide a measure of the immediate past history of said output, and a multiposition unit connected to and actuated by said electronic memory to assume one of two aspects, depending on the measured input of said memory, one of said aspects indicating speech and the other music.

2. An electronic device capable of automatically discriminating between speech and music, comprising, in combination, a level change indicator, means for connecting said level change indicator to an audio signal source so that the audio signal is the input of said indicator, said level change indicator responding to predetermined rapid changes in the level of said audio signal and producing an output signal which is a measure of the amplitude and speed of said changes, an electronic memory connected to said level change indicator to receive the output thereof and to provide a measure of the immediate past history of said output, and a multiposition unit connected to and actuated by said electronic memory to assume one of two aspects, depending on the measured input of said memory, one of said aspects indicating speech and the other music, said level change indicator comprising means for rendering the operation of said device substantially independent of the average level of the input signal.

3. An electronic device capable of automatically discriminating between speech and music, comprising, in combination, a level change indicator, means for connecting said level change indicator to an audio signal source so that said audio signal is the input of said indicator, said level change indicator comprising means for responding to predetermined rapid changes in the level of said audio signal and for producing an output signal which is a measure of the amplitude and speed of said changes and a threshold element connected to said last-named means to receive the output thereof and to suppress said output when the combined measure of the speed and amplitude of the level change is less than a predetermined threshold value, an electronic memory for receiving the output of said level change indicator and for providing a measure of the immediate past history of said output, and a multiposition unit actuated by said electronic memory to assume one of two aspects, depending on the measured input of said memory, one of said aspects indicating speech and the other music.

4. An electronic device capable of automatically discriminating between speech and music, comprising, in combination, a level change indicator, means for connecting said level change indicator to an audio signal source so that the audio signal is the input of said indicator, said level change indicator responding to predetermined rapid changes in the level of said audio signal and producing an output signal which is a measure of the amplitude and speed of said changes, an electronic memory connected to said level change indicator to receive the output thereof and to provide a measure of the immediate past history of said output, and a multiposition unit actuated by said electronic memory to assume one of two aspects, depending on the measured input of said memory, one of said aspects indicating speech and the other music, said level change indicator including an automatic gain control amplifier for rendering the operation of the device substantially independent of the average level of the input signal.

5. An electronic device for automatically and reliably discriminating between the speech and music context of an audio input, comprising, in combination, a level change indicator, means for connecting said level change indicator to an audio signal source so that the audio signal is the input of said indicator, said level change indicator selectively responding to predetermined rapid changes in level of said input signals to give output signals which are a measure of the amplitude and speed of the rapid changes in level, an electronic memory connected to said level change indicator to receive the output signals of the latter and including a storage means upon which each said indicator signal produces a measurable effect of finite duration, successive indicator signals within any period of said duration having a cumulative effect upon said storage means whereby said memory provides a measure of the immediate past history of the output of said level change indicator, and a multiposition unit, one of whose positions indicates speech and another music, said multiposition unit being so connected to the storage means of the electronic memory that it is actuated from its music position to its speech position whenever the magnitude of the effect of the signals upon said storage means exceeds a predetermined value.

6. An electronic device for automatically and reliably discriminating between the speech and music context of an audio input, comprising, in combination, a level change indicator, means for connecting said level change indicator to an audio signal source so that the audio signal is the input of said indicator, said level change indicator selectively responding to predetermined rapid drops in level of said input signals to give output signals which are a measure of the amplitude and speed of the rapid drops in level, an electronic memory connected to said level change indicator to receive the output signals of the latter and including a storage means upon which each said indicator signal produces a measurable effect of finite duration, successive indicator signals within any period of said duration having a cumulative effect upon said storage means whereby said memory provides a measure of the immediate past history of the output of said level change indicator, and a multiposition unit, one of whose positions indicates speech and another music, said multiposition unit being so connected to the storage means of the electronic memory that it is actuated from its music position to its speech position whenever the magnitude of the effect of the signals upon said storage means exceeds a predetermined value.

7. An electronic device for automatically and reliably discriminating between the speech and music context of an audio input, comprising, in combination, a level change indicator, means for connecting said level change indicator to an audio signal source so that the audio signal is the input of said indicator, said level change indicator selectively responding to predetermined rapid changes in level of said input signals to give output pulses which are a measure of the amplitude and speed of the rapid changes in level, an electronic memory connected to said level change indicator to receive the output pulses of the latter and including a storage means upon which each said indicator pulse produces a measurable effect of finite duration, successive indicator pulses within any period of said duration having a cumulative effect upon said storage means whereby said memory provides a measure of the immediate past history of the output of said level change indicator, and a multiposition unit, one of whose positions indicates speech and another music, said multiposition unit being so connected to the storage means of the electronic memory that it is actuated from its music position to its speech position whenever the magnitude of the effect of the pulses upon said storage means exceeds a predetermined value.

8. An electronic device for automatically and reliably discriminating between the speech and music context of an audio input, comprising, in combination, a level change indicator, means for connecting said level change indicator to an audio signal source so that the audio signal is the input of said indicator, said level change indicator selectively responding to predetermined rapid drops in level of said input signals to give output signals which are a measure of the amplitude and speed of the rapid drops in level, an electronic memory connected to said level change indicator to receive the output signals of the latter and including a storage means upon which each said indicator signal produces a measurable gradually diminishing effect of finite duration, successive indicator signals within any period of said duration having a cumulative effect upon said storage means whereby said memory provides a measure of the immediate past history of the output of said level change indicator, and a multiposition unit, one of whose positions indicates speech and another music, said multiposition unit being so connected to the storage means of the electronic memory that it is actuated from its music position to its speech position whenever the magnitude of the effect of the signals upon said storage means exceeds a predetermined value, said multiposition unit returning to its music position when the magnitude of said effect upon said storage means drops to a value appreciably below said predetermined value.

9. An electronic device for automatically and reliably discriminating between the speech and music context of an audio input, comprising, in combination, a level change indicator, means for connecting said level change indicator to an audio signal source so that the audio signal is the input of said indicator, said level change indicator selectively responding to predetermined rapid drops in level of said input signals to give output signals which are a measure of the amplitude and speed of the rapid drops in level, an electronic memory connected to said level change indicator to receive the output signals of the latter and including a condenser upon which each indicator signal impresses a charge of predetermined duration, successive indicator signals within any period of said duration increasing the charge on said condenser, and a multiposition unit, one of whose positions indicates music and another speech, said unit being actuated from its music position to its speech position whenever the charge on said condenser exceeds a predetermined value.

10. The device of claim 2 wherein the means for rendering the operation of the device substantially independent of the average level of the input signal is a logarithmic converter.

11. The device of claim 1 wherein the level change indicator comprises filter means for confining the action of the level change indicator to audio signal components in the frequency band corresponding to vowel sounds.

12. The device of claim 1 wherein the level change indicator comprises means for obtaining a voltage proportional to the time rate of change of the decibel level of the input audio signal, said means comprising a means for deriving the envelope of the audio signal, a logarithmic converter operating on said envelope, and a differentiator for receiving the output of said converter.

13. The device of claim 1 wherein the level change indicator comprises means for obtaining a voltage pulse with an amplitude proportional to the combined measure of the rate of change of the decibel level of the input audio signal and the amplitude of the change in the decibel level, said means comprising a means for deriving the envelope of the audio signal, a logarithmic converter operating on said envelope, and a differentiator with a time constant for receiving the output of said converter.

14. The device of claim 1 wherein the level change indicator comprises means for obtaining a voltage proportional to the time rate of change of the decibel level of the input audio signal, said means comprising a push-pull logarithmic converter operating on the audio signal, a rectifier receiving the output of said converter for giving the logarithm of the envelope of the input signal, and a differentiator connected to said converter to give the time rate of change of the logarithm of the envelope of the input signal.

15. The device of claim 1 wherein the level change indicator comprises means for obtaining a voltage pulse with an amplitude proportional to the combined measure of the rate of change of the decibel level of the input audio signal and the amplitude of the change in the decibel level, said means comprising a push-pull logarithmic converter operating on the audio signal, a rectifier receiving the output of said converter for giving the logarithm of the envelope of the input signal, and a differentiator with a time constant for receiving the output of said rectifier.

16. The device of claim 1 wherein the level change indicator includes an automatic gain control amplifier for giving the logarithm of the envelope of the input signal, said amplifier having a rate of gain recovery substantially faster than the rate of level decrease in the level drops in typical speech, the output of said amplifier being its automatic gain control bias.

17. The device of claim 16 which includes a differentiator which receives the automatic gain control bias, and a threshold element for suppressing the output of the level change indicator when the combined measure of the speed and amplitude of the level change is less than a predetermined threshold value.

18. The device of claim 1 wherein the level change indicator at its input comprises an automatic gain control amplifier having a rate of gain recovery which is a small fraction of the average rate of level decrease of the level drops in typical speech thereby effectively increasing the range of signal levels over which said device is operative.

19. The device of claim 1 in which the level change indicator comprises an automatic gain control amplifier having a rate of gain recovery which is a small fraction of the average rate of level decrease of the level drops in typical speech, a signal rectifier, and a differentiator.

20. The device of claim 1 wherein the level change indicator comprises an automatic gain control amplifier with a rate of gain recovery appreciably less than the rate of level decrease in the level drops in typical speech, and a signal rectifier for receiving the normal output of said amplifier, said automatic gain control amplifier and said rectifier together giving a voltage pulse with an amplitude proportional to the combined measure of the rate of change of the level of the audio signal and the amplitude of the change in the level.

21. The device of claim 20 wherein the output of the signal rectifier is connected to a threshold element for suppressing the output of the level change indicator when the combined measure of the speed and amplitude of the level change is less than a predetermined threshold value.

22. The device of claim 1 wherein said level change indicator comprises means for effectively confining the input signal to the envelope thereof, means for rendering the operation of said indicator substantially independent of the average level of the input signal, differentiator means for giving the time rate of change of the level of the input signal, and a threshold element for suppressing the output of said differentiator when the combined measure of the speed and amplitude of the level change is less than a predetermined threshold value.

References Cited in the file of this patent

UNITED STATES PATENTS

| | | |
|---|---|---|
| Re. 21,151 | Adair | July 18, 1939 |
| 2,089,637 | Adair | Aug. 10, 1937 |
| 2,237,457 | Tellegen | Apr. 8, 1941 |
| 2,250,144 | Welty | July 22, 1941 |
| 2,250,596 | Mountjoy | July 29, 1941 |
| 2,424,216 | Atkins | July 22, 1947 |